(12) United States Patent
Hirsch et al.

(10) Patent No.: US 9,866,282 B2
(45) Date of Patent: Jan. 9, 2018

(54) MAGNETIC INDUCTION ANTENNA FOR USE IN A WEARABLE DEVICE

(71) Applicant: Bragi GmbH, Munich (DE)

(72) Inventors: Eric Christian Hirsch, Munich (DE); Nikolaj Hviid, Munich (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 14/941,639

(22) Filed: Nov. 15, 2015

(65) Prior Publication Data

US 2016/0072558 A1  Mar. 10, 2016

Related U.S. Application Data

(60) Provisional application No. 62/211,725, filed on Aug. 29, 2015.

(51) Int. Cl.
| | |
|---|---|
| *H04B 5/02* | (2006.01) |
| *H01Q 1/12* | (2006.01) |
| *H04B 5/00* | (2006.01) |
| *H04B 1/3827* | (2015.01) |
| *H04W 4/00* | (2009.01) |

(52) U.S. Cl.
CPC ........ *H04B 5/0081* (2013.01); *H04B 1/385* (2013.01); *H04B 5/0006* (2013.01); *H04W 4/008* (2013.01)

(58) Field of Classification Search
USPC .......................... 455/41.1, 41.2, 41.3, 569.1
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Blane Jackson
(74) *Attorney, Agent, or Firm* — Goodhue, Coleman & Owens, P.C.

(57) ABSTRACT

A wearable device includes a housing, a first short range transceiver for far field communication disposed within the housing, a second short range transceiver for near field communication disposed within the housing, wherein the second short range transceiver for near field communications comprises a core and a plurality of coil turns wrapped around the core. The wearable device further includes a generally planar printed circuit board disposed within the housing and having a plurality of components mounted thereto. The core is mounted perpendicularly to the plurality of components mounted on the generally planar printed circuit board to thereby reduce electromagnetic interference. The wearable device may be an earpiece. The core may be mounted at a posterosuperior portion of the wearable device.

13 Claims, 5 Drawing Sheets

(56) References Cited

U.S. PATENT DOCUMENTS

| | | | |
|---|---|---|---|
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A * | 6/1998 | Palermo | H02J 7/025 |
| | | | 455/101 |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,230,029 B1 * | 5/2001 | Hahn | H04B 1/385 |
| | | | 379/430 |
| 6,275,789 B1 | 8/2001 | Moser et al. | |
| 6,339,754 B1 | 1/2002 | Flanagan et al. | |
| 6,408,081 B1 | 6/2002 | Boesen | |
| 6,424,820 B1 * | 7/2002 | Burdick | H04B 5/0081 |
| | | | 455/132 |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,979,035 B2 * | 7/2011 | Griffin | H04B 1/3877 |
| | | | 455/569.1 |
| 7,983,628 B2 | 7/2011 | Boesen | |
| 8,095,188 B2 * | 1/2012 | Shi | H04R 1/1066 |
| | | | 379/431 |
| 8,140,357 B1 | 3/2012 | Boesen | |
| 8,300,864 B2 * | 10/2012 | Mullenborn | H04R 25/554 |
| | | | 381/312 |
| 8,436,780 B2 * | 5/2013 | Schantz | G01S 5/14 |
| | | | 343/788 |
| 8,719,877 B2 * | 5/2014 | VonDoenhoff | B64D 11/0015 |
| | | | 725/77 |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2008/0254780 A1 | 10/2008 | Kuhl et al. | |
| 2009/0073070 A1 | 3/2009 | Rofougaran | |
| 2010/0203831 A1 | 8/2010 | Muth | |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

Bragi is on Facebook.
Bragi Update—Arrival of Prototype Chassis Parts—More People—Awesomeness (May 13, 2014).
Bragi Update—Chinese New Year, Design Verification, Charging Case, More People, Timeline(Mar. 6, 2015).
Bragi Update—First Sleeves From Prototype Tool—Software Development Kit (Jun. 5, 2014).
Bragi Update—Let's Get Ready to Rumble, A Lot to Be Done Over Christmas (Dec. 22, 2014).
Bragi Update—Memories From Apr.—Update on Progress (Sep. 16, 2014).
Bragi Update—Memories from May—Update on Progress—Sweet (Oct. 13, 2014).
Bragi Update—Memories From One Month Before Kickstarter—Update on Progress (Jul. 10, 2014).
Bragi Update—Memories From the First Month of Kickstarter—Update on Progress (Aug. 1, 2014).
Bragi Update—Memories From the Second Month of Kickstarter—Update on Progress (Aug. 22, 2014).
Bragi Update—New People @BRAGI—Prototypes (Jun. 26, 2014).
Bragi Update—Office Tour, Tour to China, Tour to CES (Dec. 11, 2014).
Bragi Update—Status on Wireless, Bits and Pieces, Testing-Oh Yeah, Timeline(Apr. 24, 2015).
Bragi Update—The App Preview, The Charger, The SDK, BRAGI Funding and Chinese New Year (Feb. 11, 2015).

(56) References Cited

OTHER PUBLICATIONS

Bragi Update—What We Did Over Christmas, Las Vegas & CES (Jan. 19, 2014).
Bragi Update—Years of Development, Moments of Utter Joy and Finishing What We Started(Jun. 5, 2015).
Bragi Update—Alpha 5 and Back to China, Backer Day, On Track(May 16, 2015).
Bragi Update—Beta2 Production and Factory Line(Aug. 20, 2015).
Bragi Update—Certifications, Production, Ramping Up.
Bragi Update—Developer Units Shipping and Status(Oct. 5, 2015).
Bragi Update—Developer Units Started Shipping and Status (Oct. 19, 2015).
Bragi Update—Developer Units, Investment, Story and Status(Nov. 2, 2015).
Bragi Update—Getting Close(Aug. 6, 2014).
Bragi Update—On Track, Design Verification, How It Works and What's Next(Jul. 15, 2015).
Bragi Update—On Track, On Track and Gems Overview.
Bragi Update—Status on Wireless, Supply, Timeline and Open House@BRAGI(Apr. 1, 2015).
Bragi Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for The Dash (Feb. 12, 2014).
Stretchgoal—Windows Phone Support (Feb. 17, 2014).
The Dash + The Charging Case & The Bragi News (Feb. 21, 2014).
The Dash—A Word From Our Software, Mechanical and Acoustics Team + An Update (Mar. 11, 2014).
Update From Bragi—$3,000,000—Yipee (Mar. 22, 2014).
International Search Report & Written Opinion, PCT/EP2016/07216 (dated Oct. 18, 2016).

* cited by examiner

MAGNETIC INDUCTION ANTENNA FOR USE IN A WEARABLE DEVICE

PRIORITY STATEMENT

This application claims priority to U.S. Provisional Patent Application No. 62/211,725, filed Aug. 29, 2015, hereby incorporated by reference in its entirety.

FIELD OF THE INVENTION

The present invention relates to antenna. More particularly, but not exclusively, the present invention relates to an antenna for use in a wearable device such as an ear piece.

BACKGROUND OF THE ART

Various types of wireless communication linkages exist. However, there can be numerous issues when used in particular environments and/or applications. For example, in the case of wearable devices where a left earpiece is to communicate with a right earpiece there may be issues using Bluetooth wireless transceivers due to a combination of factors involving attenuation, reliability in varied environments and sensitivity. An alternative approach is to use near field magnetic induction (NFMI). NFMI is unaffected by body tissues and demonstrates improved sensitivity. However, use of NFMI introduces additional problems. For example, the placement of the antenna may be problematic. Magnetic fields induced by the PCB limits the areas of the wearable device capable of providing optimal electromagnetic field generation. In addition, there are concerns regarding the possibility of additional interference generated from other related electronic components.

SUMARY OF THE INVENTION

Therefore it is a primary object, feature, or advantage of the present invention to improve over the state of the art.

It is a further object, feature, or advantage of the present invention to provide for an improved wearable device.

It is a still further object, feature, or advantage of the present invention to provide an antenna for NFMI suitable for use in a wearable device to allow for communication with other wearable devices.

Another object, feature, or advantage of the present invention is to provide an antenna for induction which avoids magnetic fields induced by the printed circuit board and other electronic components associated with a wearable device.

Yet another object, feature, or advantage of the present invention is to provide for improved placement of an antenna within a wearable device for improved orientation of the electromagnetic field.

A further object, feature, or advantage of the present invention is to provide for an antenna that is sufficiently powerful for expected tasks and is straightforward in its manufacturing and assembly.

A still further object, feature or advantage of the present invention is position an antenna relative to a Bluetooth antenna to facilitate enhancement of Bluetooth reception by the Bluetooth antenna.

Another object, feature, or advantage of the present invention is to position an antenna in the posterior superior segment of a wearable to allow for reliable bilateral transmission of audio and data to another wearable device.

Yet another object, feature, or advantage of the present invention is to provide a common ground plane between two wearable devices to allow for expansion of the electromagnetic field.

A further object, feature, or advantage of the present invention is to provide for antenna contact with the skin of a user wearing the wearable device in order to extend the electromagnetic field.

A still further object, feature, or advantage of the present invention is to allow for coils to be positioned in various places.

Another object, feature, or advantage of the present invention is to orient an antenna perpendicular to other electronic components to minimize electromagnetic interference with the other components.

Yet another object, feature, or advantage of the present invention is to orient an antenna at the perimeter of a PCB in order to limit the electromagnetic field interference.

One of these and/or other objects, features, or advantages of the present invention will become apparent from the specification and claims that follow. It is to be understood that different embodiments are disclosed herein and that no embodiment need meet each and every object, feature, or advantage as set forth herein. Different embodiments may have different objects, features, or advantages.

According to one aspect, a wearable device is provided. The wearable device includes a housing, a first short range transceiver for far field communication disposed within the housing, a second short range transceiver for near field communication disposed within the housing, wherein the second short range transceiver for near field communications comprises a core and a plurality of coil turns wrapped around the core. The wearable device further includes a generally planar printed circuit board disposed within the housing and having a plurality of components mounted thereto. The core is mounted perpendicularly to the plurality of components mounted on the generally planar printed circuit board to thereby reduce electromagnetic interference. The wearable device may be an earpiece. The core may be mounted at a posterosuperior portion of the wearable device. The core may include ferrite. The wearable device may further include a battery with the core being a ferrite sheet magnetic shield spacer wrapped around the battery. The core may mounted at a perimeter of the printed circuit board. The first short range transceiver may be a Bluetooth transceiver.

According to another aspect, a system is provided. The system includes a first wearable device and a second wearable device. Each of the first wearable device and the second wearable device include a housing, a first short range transceiver for far field communication disposed within the housing, and a second short range transceiver for near field communication disposed within the housing. The first wearable device may be a first ear piece and the second wearable device may be a second ear piece. The second short range transceiver for near field communication of the first wearable device may be configured for near field communications with the second short range transceiver for near field communication of the second wearable device. The second short range transceiver for near field communication for each of the first wearable device and the second wearable device may include a core and a plurality of coil turns wrapped around the core. The core may be orthogonally disposed relative to a surface of a printed circuit board. The core may be mounted at a posterosuperior portion of each of the first wearable device and the second wearable device. The core may include ferrite. Each of the first wearable device and the second wearable device may further include a battery and the core may include a ferrite sheet magnetic shield spacer wrapped around the battery. The core may include a ferrite sheet magnetic shield spacer and need not be wrapped around the battery. The core may be mounted at a perimeter of a printed circuit board. The first short range transceiver may be of any number of types of transceivers including a Bluetooth transceiver.

According to another aspect, a set of wireless ear pieces includes a left ear piece comprising a left ear piece housing, a speaker associated with the left ear piece housing, a wireless radio transceiver, and a near field magnetic induction (NFMI) transceiver. The set further includes a right ear piece comprising a right ear piece housing, a speaker associated with the right ear piece housing, a wireless radio transceiver, and a near field magnetic induction (NFMI) transceiver. The left ear piece and the right ear piece are configured to communicate with a mobile device using either the wireless radio transceiver of the left ear piece or the wireless radio transceiver of the right ear piece. The left ear piece is configured to communicate with the right ear piece using the NFMI transceiver of the left ear piece and the NFMI transceiver of the right ear piece.

DETAILED DESCRIPTION

The present invention relates to an antenna for use in a wearable device. Although generally described herein with respect to a near field magnetic induction (NFMI) antenna for use in an ear piece within a set of ear pieces, it is to be understood that the present invention is not limited to that specific application and may be used as an antenna for induction in other types of devices including other types of wearable devices.

Figure 1:
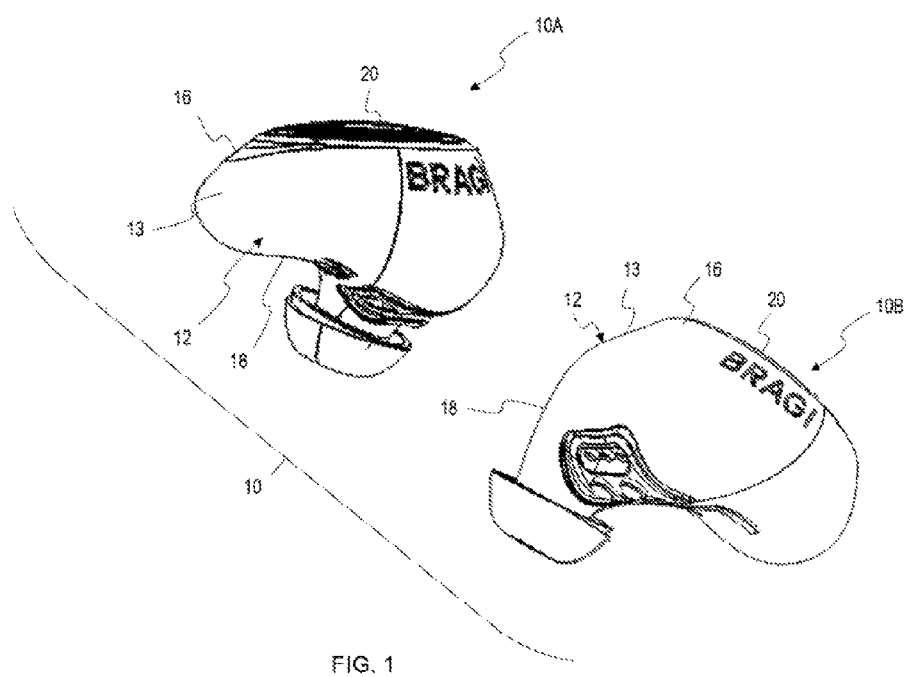
FIG. 1 illustrates one example of a system including two wearable devices in the form of left and right ear pieces which bi-directionally communicate with each other.
Figure 2:
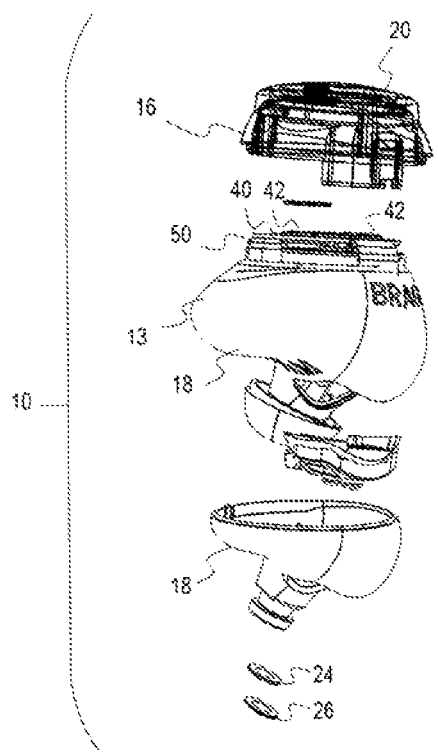
FIG. 2 is an exploded view of a wearable device.

FIG. 1 illustrates one example of a system 10 which includes a first wearable device 10A in the form of an ear piece and a second wearable device 10B also in the form of an ear piece, each having an ear piece housing 12 with a central portion 13 with an upper portion 16 and a lower portion 18. A light guide assembly 20 is shown operatively connected to the housing to provide for selective illumination to provide feedback to a user. FIG. 2 provides an exploded view of the wearable device 10A. A waterproof pad 24 and protection mesh 26 are shown. In addition in the central or main portion 13 of the wearable device 10A a printed circuit board 40 is shown with a plurality of electronic components 42 mounted thereto. The plurality of electronic components 42 may include a short range transceiver configured for far field communications such as a wireless radio such as a Bluetooth transceiver, an ultra-wideband (UWB), or other type of transceiver. A near field magnetic induction (NFMI) antenna 50 is mounted at an edge or perimeter of the printed circuit board 40. The NFMI antenna transceiver 50 is mounted at a posterosuperior portion of the wearable device 10A.

The system 10 allows for near field communication of audio channels between the left and right-sided wearable devices 10A, 10B. Other types of data may also be communicated between the left and right-sided wearable devices 10A, 10B if desired including sensor information or other data.

Figure 3:
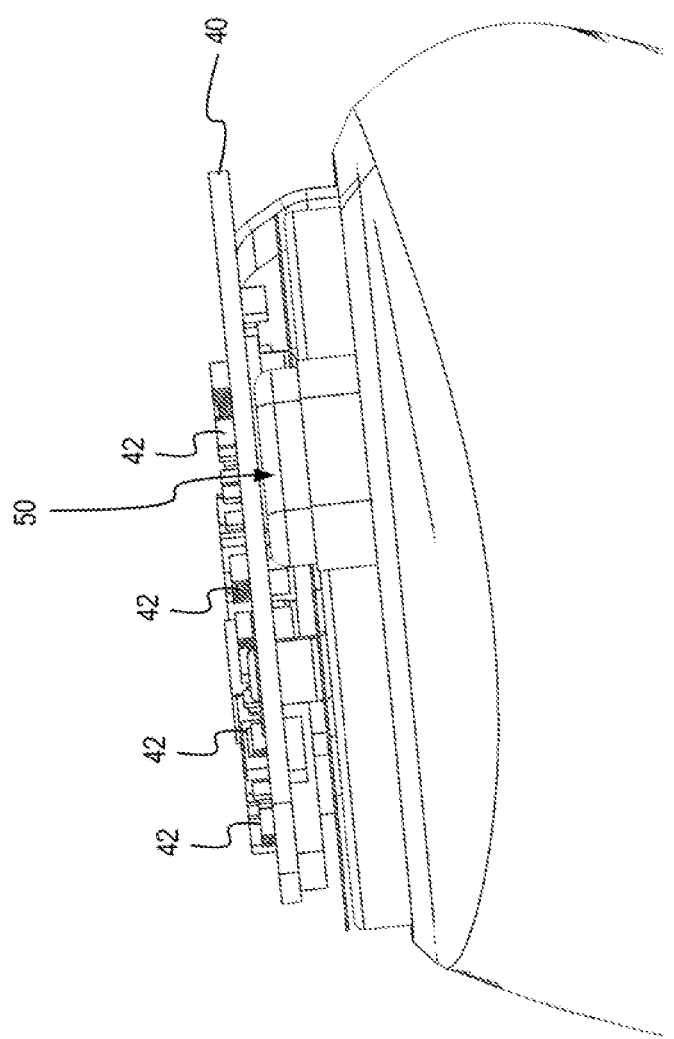
FIG. 3 illustrates a printed circuit board of the wearable device positioned relative to an induction circuit/antenna.
Figure 4:
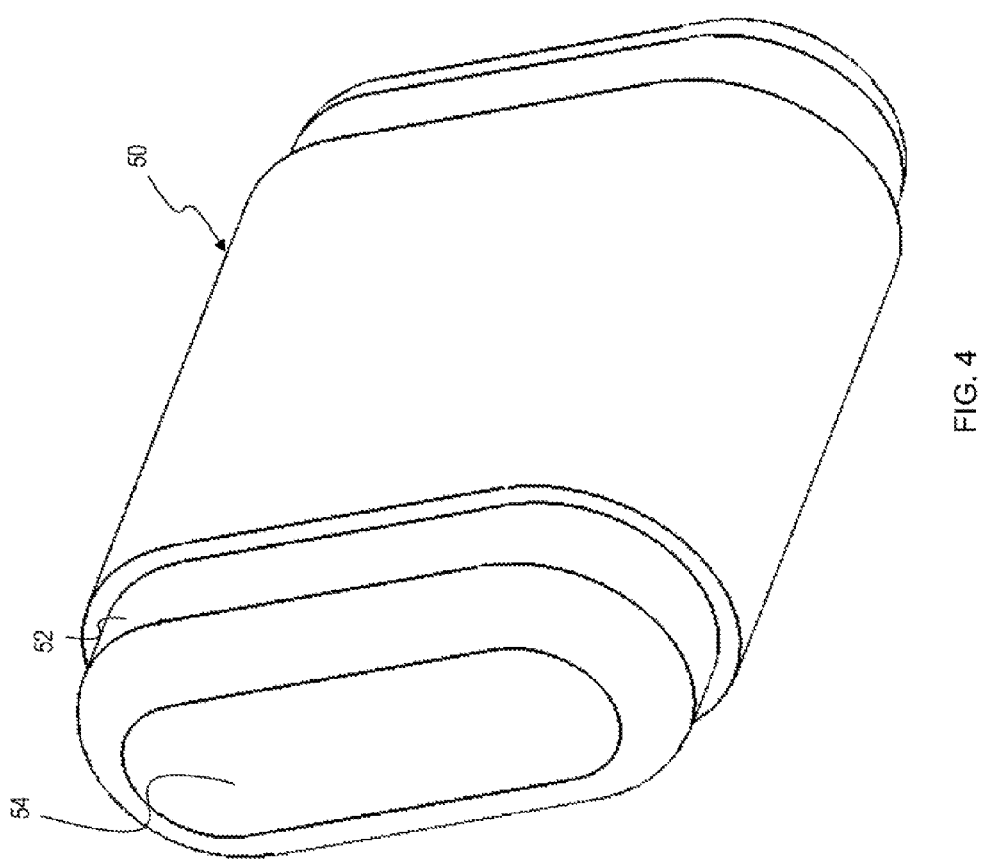
FIG. 4 illustrates a core.
Figure 5:
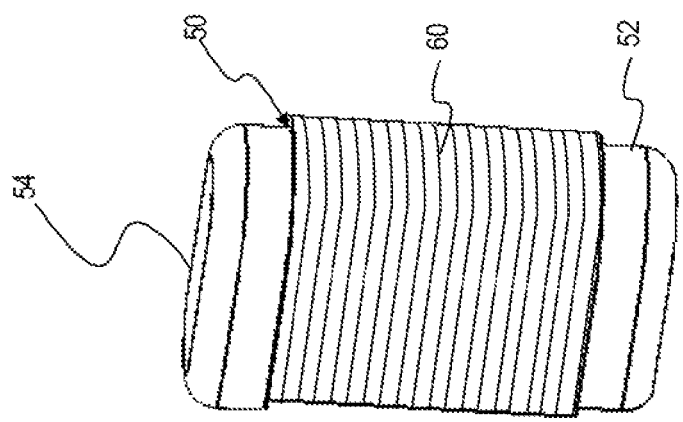
FIG. 5 illustrates a core with coil turns thereon.

FIG. 3 illustrates another view of printed circuit board 40 with electronic components 42. A NFMI antenna 50 is shown mounted at an edge or perimeter of the printed circuit board 40. The printed circuit board is generally planar. Note that the NFMI antenna 50 is mounted perpendicularly or orthogonally to the top surface of the printed circuit board 40 and the plurality of components 42 mounted thereto. Positioning the NFMI antenna 50 in this relationship provides for reducing electromagnetic interference. The core of the NFMI antenna 50 may be formed of a ferrite material. For example, the core of the NFMI antenna 50 may be a ferrite sheet magnetic spacer. As shown in FIG. 4, where the core of the NFMI antenna 50 includes a ferrite sheet magnetic spacer 52, an exterior of the NFMI antenna 50 may be positioned over or wrapped around a battery 54. As shown in FIG. 5, a plurality of coil turns 60 may be wrapped around the battery 54 that is the core of the NFMI antenna 50. The coil turns 60 wrapped around the battery 54 (or other core) form the NFMI antenna 50.

In one embodiment NFMI may be used for the communication and audio channels between the left and right sided wearable devices. Placement of the coil at the perimeter of the wearable improves the electromagnetic field, avoiding degradation from adjacent onboard electronics. This allowed for optimal placement of the magnetic field for transmission and reception between the left and right wearable. The preferred embodiment allows for precise positioning within the device for optimal orientation for the electromagnetic field. Further, the preferred embodiment also allows for an NFMI antenna that is sufficiently powerful for the expected tasks, is straightforward in its manufacturing and assembly.

Therefore, a wearable device has been shown and described and a system including multiple ear pieces which communicate with one another has also been shown and described. It is to be understood that the present invention contemplates numerous variations, options, and alternatives. The present invention is not to be limited to the specific embodiments and examples set forth herein.

What is claimed is:

1. A wearable device comprising:
   a housing;
   a first short range transceiver for far field communication disposed within the housing;
   a second short range transceiver for near field communication disposed within the housing;
   wherein the second short range transceiver for near field communications comprises a near field magnetic induction antenna comprising a plurality of coil turns wrapped around a core;
   a printed circuit board disposed within the housing and having a plurality of components mounted thereto;
   wherein the near field magnetic induction antenna is mounted perpendicularly to a plane associated with the first short range transceiver and the second short range transceiver mounted on the printed circuit board to thereby reduce electromagnetic interference.

2. The wearable device of claim 1 wherein the wearable device is an earpiece.

3. The wearable device of claim 2 wherein the core associated with the near field magnetic induction antenna is mounted at a posteosuperior portion of the wearable device.

4. The wearable device of claim 1, wherein the plurality of coil turns are wrapped around a ferrite sheet magnetic shield spacer surrounding the battery.

5. The wearable device of claim 1 wherein the core associated with the near field magnetic induction antenna is mounted at a perimeter of the printed circuit board.

6. The wearable device of claim 1 wherein the first short range transceiver is a Bluetooth transceiver.

7. A system comprising:
a first wearable device;
a second wearable device;
wherein each of the first wearable device and the second wearable device comprises a housing, a first short range transceiver for far field communication disposed within the housing, a second short range transceiver for near field communication disposed within the housing, and a printed circuit board disposed within the housing, the second short range transceiver for near field communication is positioned on a periphery of the printed circuit board;
wherein the second short range transceiver for near field communication for each of the first wearable device and the second wearable device comprises a core and a plurality of coil turns wrapped around the core forming an antenna, wherein the antenna of the second short range transceiver is mounted perpendicularly to a plane associated with the printed circuit board.

8. The system of claim 7 wherein the first wearable device is a first ear piece and the second wearable device is a second ear piece and wherein the second short range transceiver for near field communication of the first wearable device is configured for near field communications with the second short range transceiver for near field communication of the second wearable device.

9. The system of claim 7 wherein the plurality of coil turns are wrapped around a ferrite sheet magnetic shield spacer surrounding the battery.

10. The system of claim 9 wherein the core is mounted at a posterosuperior portion of each of the first wearable device and the second wearable device.

11. The system of claim 10 wherein a ferrite sheet magnetic shield spacer is wrapped around the battery, and wherein the plurality of coil turns are wrapped around the ferrite sheet magnetic shield spacer.

12. The system of claim 7 wherein the first short range transceiver is a Bluetooth transceiver, and wherein the second short range transceiver is a near field magnetic induction transceiver.

13. A set of wireless ear pieces, comprising:
a left ear piece comprising a left ear piece housing, a speaker associated with the left ear piece housing, a wireless radio transceiver mounted on a printed circuit board, and a near field magnetic induction (NFMI) transceiver including an antenna comprising a plurality of coil turns wrapped around a core;
a right ear piece comprising a right ear piece housing, a speaker associated with the right ear piece housing, a wireless radio transceiver mounted on a printed circuit board, and a near field magnetic induction (NFMI) transceiver including an antenna comprising a plurality of coil turns wrapped around a core;
wherein the left ear piece and the right ear piece are configured to communicate with a mobile device using either the wireless radio transceiver of the left ear piece or the wireless radio transceiver of the right ear piece; and
wherein the left ear piece is configured to communicate with the right ear piece using the NFMI transceiver of the left ear piece and the NFMI transceiver of the right ear piece, wherein the antennas of the NFMI transceiver of the left earpiece and the NFMI transceiver of the right earpiece are orthogonally disposed relative to a top surface of the printed circuit board and the NFMI transceiver is positioned peripherally to the printed circuit board, and wherein the NFMI transceiver of the left earpiece is positioned at a posterosuperior position within the left earpiece housing and wherein the NFMI transceiver of the right earpiece is positioned at a posterosuperior position within the right earpiece housing.

* * * * *